United States Patent
Stepanov

(10) Patent No.: US 7,194,163 B2
(45) Date of Patent: Mar. 20, 2007

(54) MULTI-LAYERED STRUCTURE CHARACTERIZATION

(75) Inventor: Dmitrii Yu Stepanov, Croydon Park (AU)

(73) Assignee: Redfern Optical Components Pty. Ltd., Eveleigh, New South Wales (AU)

( * ) Notice: Subject to any disclaimer, the term of this patent is extended or adjusted under 35 U.S.C. 154(b) by 0 days.

(21) Appl. No.: 10/507,799

(22) PCT Filed: Mar. 12, 2003

(86) PCT No.: PCT/AU03/00296

§ 371 (c)(1),
(2), (4) Date: Mar. 10, 2005

(87) PCT Pub. No.: WO03/076995

PCT Pub. Date: Sep. 18, 2003

(65) Prior Publication Data

US 2005/0169599 A1    Aug. 4, 2005

(30) Foreign Application Priority Data

Mar. 12, 2002 (AU) .................................. PS1044

(51) Int. Cl.
G02B 6/34 (2006.01)
(52) U.S. Cl. ......................................... 385/37
(58) Field of Classification Search ................... 385/37
See application file for complete search history.

(56) References Cited

U.S. PATENT DOCUMENTS

| | | |
|---|---|---|
| 5,666,224 A | 9/1997 | Wood et al. |
| 6,445,852 B1 | 9/2002 | Feced et al. |
| 6,538,731 B2 | 3/2003 | Niu et al. |

FOREIGN PATENT DOCUMENTS

| | | |
|---|---|---|
| WO | WO 99/67664 | 12/1999 |
| WO | WO 01/11401 A1 | 2/2001 |

OTHER PUBLICATIONS

Journal of Lightwave Technology, vol. 5, No. 8, Aug. 1997, "Fiber Bragg Grating Tewchnology Fundamentals and Overview" by Kenneth O. Hill and Gerald Meltz, pp. 1263-1276.*

(Continued)

*Primary Examiner*—Sung Pak
*Assistant Examiner*—Tina M. Wong
(74) *Attorney, Agent, or Firm*—Blakely, Sokoloff, Taylor & Zafman; Stephen M. De Klerk

(57) ABSTRACT

A method and an apparatus (10) for characterising a multi-layered structure (28) during formation of said multi-layered structure are disclosed. The method includes the steps of measuring the complex reflectivity of the multi-layered structure (28) at a wavelength outside of the bandgap of the multi-layered structure (28) and calculating a complex coupling coefficient from the measured complex reflectivity of the multi-layered structure (28) continuously or at intervals during the formation process. The apparatus (10) includes an interferometer (24) for creating writing beams (20, 22) to form the multi-layered structure (28), such as a Bragg grating, in an optical fibre (16) and an interrogation unit (40) for measuring the complex reflectivity and for calculating the complex coupling coefficient of the multi-layered structure (28) and for producing a feedback sigal which is communicated back to the interfemometer (24). The interrogation unit (40) includes an optical circuit with Mach-Zehnder or Sganac/Michelson interferometer arrangement.

25 Claims, 7 Drawing Sheets

OTHER PUBLICATIONS

Petermann, E. Ingemar, et al. "Characterization of Fiber Bragg Gratings by Use of Optical Coherence-Domain Reflectometry," *Journal of Lightwave Technology*, Nov. 1999, pp. 2371-2378, vol. 17, No. 11, IEEE.

Skaar, Johannes, et al. "Reconstruction of gratings from noisy reflection data," *Journal of the Optical Society of America*, Nov. 2002, pp. 2229-2237, vol. 19, No. 11, Optical Society of America.

* cited by examiner

MULTI-LAYERED STRUCTURE CHARACTERIZATION

CROSS REFERENCE TO OTHER APPLICATIONS

This Application is a National Phase of International Application No. PCT/AU03/00296, filed on Mar. 12, 2003, which claims priority from Australian Patent Application No. PS 1044, filed on Mar. 12, 2002.

This application claims the benefit of a 371 of PCT/AU03/00296 filed 12 Mar. 2003.

FIELD OF THE INVENTION

The present invention relates broadly to a method of characterising a multi-layered structure during formation of said multi-layered structure, to a method of forming a multi-layered structure having a specified coupling coefficient profile, and to an apparatus for forming a multi-layered structure having a specified coupling coefficient profile.

BACKGROUND OF THE INVENTION

Typically, forming one-dimensional multi-layered structures in a photosensitive material, e.g. so called writing of Bragg gratings, involves an interferometer in which two coherent light beams (typically in the UV wavelength range) are being directed along separate optical paths and brought to interference substantially within the photosensitive material. Within the photosensitive material, refractive index changes are induced through the interaction between the light beams and the photosensitive material, and refractive index profiles are formed due to interference patterns, whereby grating structures are written.

The characterisation of gratings during the formation process has become a significant aspect within the photonics technology field. For example, in one implementation of writing of long grating structures into an optical fibre, the quality of the written grating depends on the accuracy of matching of the velocity of an interference pattern change (sometimes referred to as travelling interference pattern) generated in the grating writing setup to the velocity of the optical fibre being translated through the interference region. In one such grating writing setup, the control of the interference pattern velocity is achieved by modulating the optical phase difference between the interfering beams e.g. by using optical modulators. Electronic control of the optical phase difference and single frequency operation of the UV laser result in an extreme accuracy, typically of the order of $10^{-10}$ that can be achieved by setting the velocity of the interference pattern using state of the art electronic equipment and stabilising the UV laser.

Unfortunately, the accuracy of the fibre motion depends on the operation of mechanically inertial translation stages and is typically not exceeding $10^{-3}$–$10^{-5}$ for the translation velocity. Therefore, accurate passive synchronisation required may not be achievable with the translation stages currently available on the market.

Thus, an active feedback approach has been suggested to compensate for the inaccuracies in the fibre motion control to achieve high fidelity of such grating fabrication methods. Measuring characteristic parameters of a grating under fabrication, comparing the measured parameters to specified desired parameters, generating corrections to the grating design parameters and closing a feedback loop by applying the corrections to a grating writing control system in the process of grating writing is the underlying concept of relevant prior art. Grating design serves as a reference in this approach, with the corrections accounting for random or systematic imperfections in the grating fabrication process such as the above mentioned translation velocity inaccuracies. Therefore, the grating quality will ultimately depend on the quality of the grating measurements and the quality of the feedback loop rather than on the quality of the motion control.

A fibre Bragg grating can be fully described or characterised by either its coupling coefficient, or its impulse response, or its reflection coefficient. Those are sometimes referred to as grating design, temporal response and spectral response respectively and are related through various transforms, e.g. impulse response is Fourier transform of the complex reflection coefficient, and the coupling coefficient can be deduced from the impulse response using inverse scattering methods. Experimentally, both amplitudes and phases of the coupling and reflection coefficients as well as the ones of the impulse response are typically measured. Mathematically, the characteristic parameters with both amplitude and phase can be expressed as complex functions and, to emphasize that, we will refer to the measurands throughout the present description as to complex coupling and reflection coefficients, complex impulse response function correspondingly.

Known techniques for fibre Bragg grating characterisation can be categorised in terms of the prime measurands mentioned above or in terms of the principle of operation. Naturally, both are often related. The side diffraction techniques enable the direct measurements of the grating coupling coefficient and are based on the external Bragg diffraction at the in-fibre Bragg grating. Optical low-coherence reflectometry (OLCR) methods have been shown to produce the impulse response of the grating device under investigation. The optical frequency domain characterisation (OFDC) methods are related to coherent interferometry and provide spectral data for further analysis. The methods of so called optical space domain reflectometry (OSDR) introduce a small phase perturbation in the grating structure and the spatial variation of its parameters is derived from the grating response to the perturbation. An "industry standard" modulation phase-shift (MPS) technique is based on measuring relative phase delay between the carrier and modulation sidebands in the spectrum of the intensity modulated tunable laser and as such provides characterisation data in the spectral domain.

Overall, a general disadvantage of most of the above mentioned prior art techniques is an excessive amount of information being acquired which makes them relatively slow. This is because the measurements need to be conducted across a relevant wavelength range, and thus involve measurements of spectra and the associated necessary amount of data, and tuning of the laser source. Therefore, the grating fabrication speed may need to be slowed down to account for e.g. a slow scanning speed of a frequency-swept laser used in the OFDC approach. However, it has been recognised by the applicant that the excessive data collection may not be needed at all, should a different approach to acquiring characterisation data be taken.

The present invention seeks to provide an alternative grating characterisation method which can provide the basis for real-time grating characterisation suitable for writing of gratings with the active feedback approach.

SUMMARY OF THE INVENTION

In accordance with a first aspect of the present invention, there is provided a method of characterising a multi-layered structure during formation of said multi-layered structure, the method comprising the step of extracting the complex coupling coefficient of the multi-layered structure being formed continuously or at intervals during the multi-layered structure formation process.

The step of extracting the complex coupling coefficient preferably comprises measuring the complex reflectivity of the multi-layered structure at a wavelength outside of the bandgap of the multi-layered structure and calculating the complex coupling coefficient from the measured complex reflectivity.

The step of calculating the complex coupling coefficient advantageously accounts for the linear proportionality between the complex coupling coefficient and the complex reflection coefficient at a wavelength outside the bandgap of the multi-layered structure.

In one embodiment, the complex reflectivity is measured for at least two wavelengths outside of the bandgap of the multi-layered structure continuously or at each interval.

The step of measuring the complex reflectivity of the multi-layered structure may comprise utilising a Sagnac/Michelson interferometer setup, wherein the multi-layered structure is located in the Sagnac loop.

The Sagnac/Michelson interferometer setup may comprise a 2×2 coupler.

The Sagnac/Michelson interferometer setup may comprise a 3×3 coupler.

In one embodiment, the method further comprises the step of controlling a phase rate offset in the phase measurement of the complex reflectivity of the multi-layered structure.

In a preferred embodiment, the method further comprises the step of utilising a comparison of the extracted complex coupling coefficients and a specified complex coupling coefficient profile of the multi-layered structure as a feedback during the formation process.

The multi-layered structure may comprise a Bragg grating. The grating may be formed in an optical waveguide. The waveguide may comprise an optical fibre.

In accordance with a second aspect of the present invention, there is provided an apparatus for forming a multi-layered structure of specified complex coupling coefficient profile, the apparatus comprising:

means for extracting the complex coupling coefficient of the multi-layered structure being formed continuously or at intervals during the multi-layered structure formation process, and a processing unit arranged, in use, to generate a feedback signal for the formation process based on a comparison of the extracted complex coupling coefficients and the specified complex coupling coefficient profile.

The means for extracting the complex coupling coefficient preferably comprises a measurement unit for measuring the complex reflectivity of the multi-layered structure at a wavelength outside of the bandgap of the multi-layered structure, and a unit for calculating the complex coupling coefficient from the measured complex reflectivity.

The measurement unit is advantageously arranged, in use, to measure the reflectivity for at least two wavelengths outside of the bandgap of the multi-layered structure continuously or at each interval.

The unit for calculating the complex coupling coefficient preferably accounts for the linear proportionality between the complex coupling coefficient and the complex reflection coefficient at a wavelength outside the bandgap of the multi-layered structure.

The measurement unit may comprise a Sagnac/Michelson interferometer, wherein the multi-layered structure is located in the Sagnac loop.

The Sagnac/Michelson interferometer may comprise a 2×2 coupler.

The Sagnac/Michelson interferometer may comprise a 3×3 coupler.

In one embodiment, the Sagnac/Michelson interferometer comprises a means for controlling a phase rate offset in the phase measurement of the complex reflectivity of the multi-layered structure.

The means for controlling the phase rate offset may comprise an optical modulator located in the Sagnac/Michelson loop on at least one side of the multi-layered structure. The modulator may comprise an acousto-optic modulator or an electro-optic modulator.

The apparatus may further comprise a feedback unit for providing the generated feedback signal to a writing unit for forming the multi-layered structure. In one embodiment, the apparatus further comprises the writing unit.

In accordance with a third aspect of the present invention, there is provided an active feedback fabrication method for forming a multi-layered structure, the method comprising the steps of extracting the complex coupling coefficient of the multi-layered structure being formed continuously or at intervals during the formation process, and utilising a comparison of the extracted complex coupling coefficients and a specified complex coupling coefficient profile of the multi-layered structure as a feedback during the formation process.

BRIEF DESCRIPTION OF THE DRAWINGS

Preferred embodiments of the present invention will now be described, by way of example only, with reference to the accompanying drawings.

DETAILED DESCRIPTION OF THE EMBODIMENTS

The preferred embodiments described provide a grating characterisation system and method suitable for real-time characterisation for writing of gratings in a waveguide using the active feedback approach.

Figure 1:
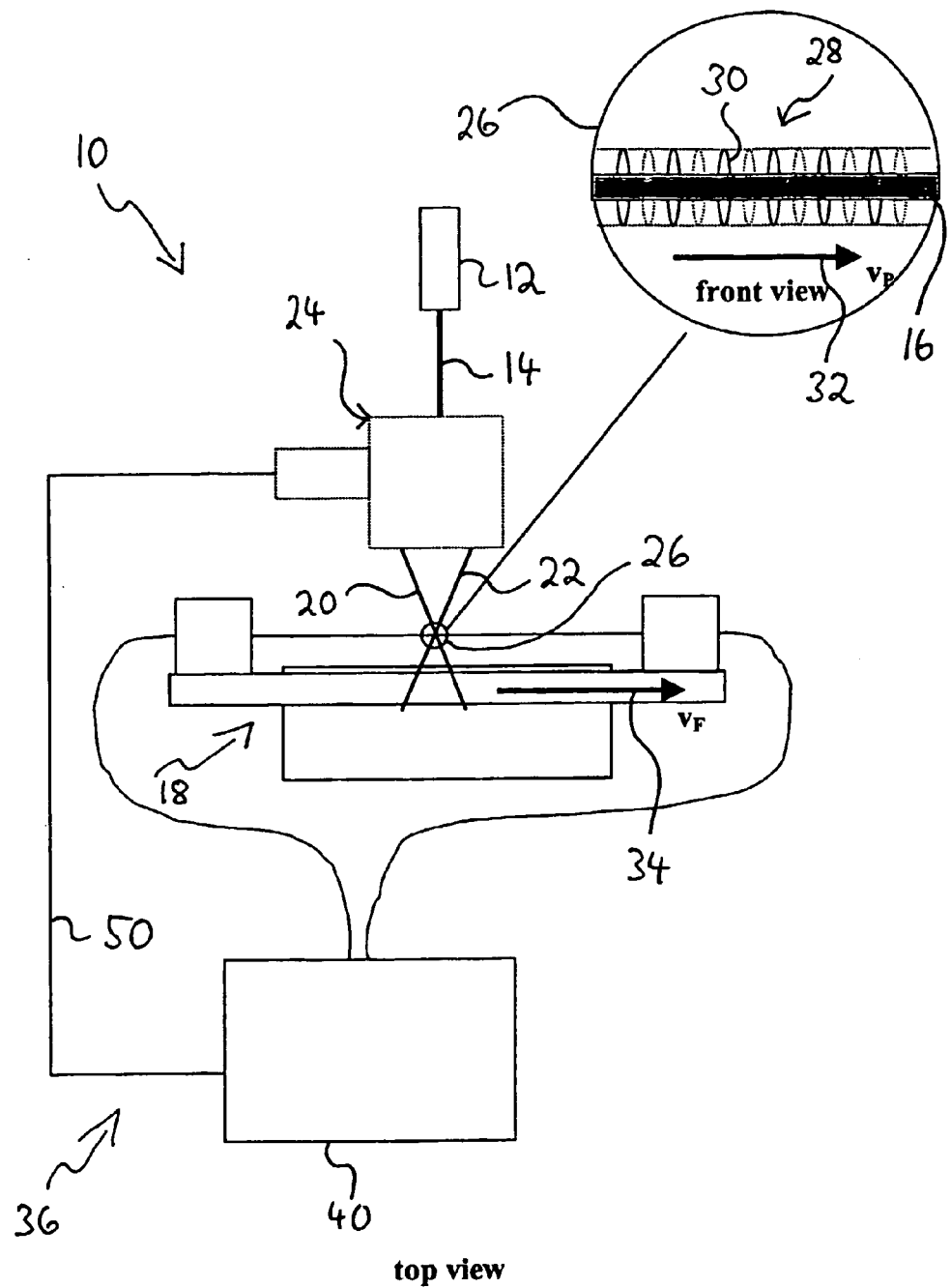
FIG. 1 is a schematic diagram illustrating a grating writing system embodying the present invention.

In FIG. 1, a grating writing system 10 embodying the present invention is shown. The system 10 comprises a UV laser source 12 providing a laser beam 14 for the writing of the optical grating into an optical fibre 16 mounted on a linear translation stage 18.

A suitable interferometer setup 24 is utilised to split the incoming laser beam 14 into two coherent writing beams 20, 22, and to bring the writing beams 20, 22 to interference in an interference region 26 located at the optical fibre 16 for writing the optical grating. As shown in the inlet in FIG. 1, an interference pattern 28 is thus created in the interference region 26 which extends along a finite length of the propagating optical fibre 16 at any given point in time.

The interferometer setup 24 is arranged in a manner such that a relative phase difference is introduced between the writing beams 20, 22, which results in the interference pattern 28 to change continuously, i.e. the interference fringes e.g. 30 move "across" the interference region 26 with a velocity $v_P$ as indicated by arrow 32. For the writing of a long optical grating having a constant pitch, the velocity $v_P$ is matched to the translation velocity $v_F$ of the optical fibre 16 through the interference region 26, that is the velocity of the translation stage 18 as indicated by arrow 34. It will be appreciated by the person skilled in the art that control of the relative phase shift between the writing beams 20, 22 can also be used to write optical gratings of varying pitch, such as chirped gratings.

The system 10 further comprises a feedback circuit 36 which is connected to the optical fibre portion 16 mounted on the translation stage 18.

The feedback circuit 36 comprises an interrogation unit 40. In operation during writing of an optical grating, a feedback signal is created as a result of a measured interrogation output at the interrogation unit 40, and the feedback signal is communicated back to the interferometer setup 24 via a feedback loop 50 for an active feedback approach to writing of the optical grating.

Figure 2:
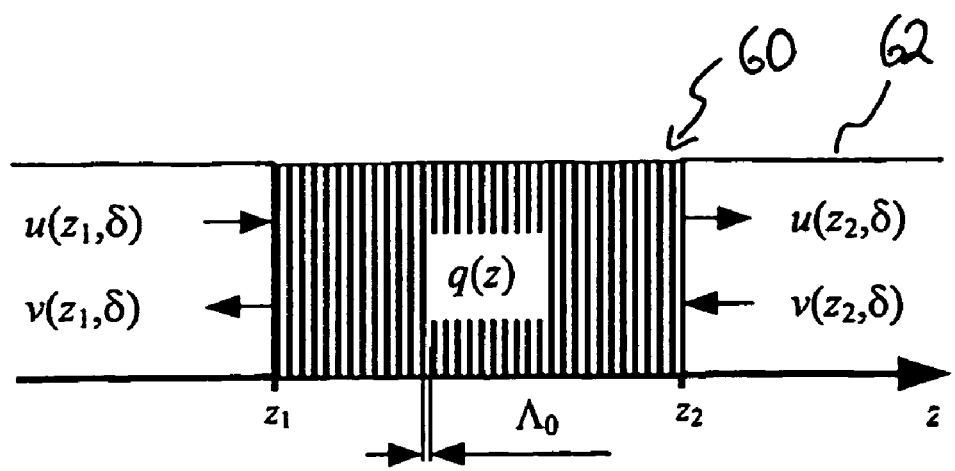
FIG. 2 is a schematic diagram illustrating a grating portion in a characterisation system embodying the present invention with incident, reflected and transmitted lightwaves shown.

Turning now to FIG. 2, the underlying concept of the novel method of characterisation of the optical grating during the writing process will now be described. FIG. 2 shows a snapshot of a grating writing process. A grating portion 60 has been being written in an optical fibre 62 from a starting position $z_1$ to the position reached at the time of the snapshot, $z_2$. The optical properties of the grating portion 60 can be described by the following coupled mode equations:

$$du(z,\delta)/dz = +i\delta u(z,\delta) + q(z)v(z,\delta), \quad (1a)$$

$$dv(z,\delta)/dz = -i\delta v(z,\delta) + q^*(z)u(z,\delta), \quad (1b)$$

where $q(z)$ and $q^*(z)$ are the complex coupling coefficient of the grating portion 60 and its complex conjugate correspondingly, $u(z,\delta)$ is a forward propagating wave and $v(z,\delta)$ is a backward propagating wave, z is the coordinate along the fibre 62 and $$\delta = \beta - \beta_0 \equiv \frac{2\pi}{\lambda} n - \frac{\pi}{\Lambda_0}, \quad (2)$$

is the frequency detuning from the bandgap of the desired grating, with $\lambda$ being the signal wavelength, n being the effective refractive index of the lightwave mode at the signal wavelength and $\Lambda_0$ being the grating spatial period. Equations (1a), (1b) can be reduced to Ricatti equation $$q^*(z) = 2i\delta r(z,\delta) + \frac{dr(z,\delta)}{dz} + q(z)r^2(z,\delta), \quad (3)$$

for the local reflectivity $r(z,\delta) = v(z,\delta)/u(z,\delta)$ which is further simplified to $$q^*(z) = 2i\delta r(z,\delta) \quad (4)$$

assuming that the detuning $\delta$ from the Bragg wavelength (bandgap) is large and the second and the third terms in the right hand side of Equation (3) can be neglected. Equation (4) shows that the grating coupling coefficient is directly derived from a largely detuned spectral component of the reflection spectrum. This spectral component evolves as the grating is being written corresponding precisely to the grating coupling coefficient of the grating portion 60. It is important to realise that the measurements at a detuned wavelength have the advantage of low probe attenuation and, therefore, unlimited penetration of the probe to all the "layers" of the grating. When the measurements are performed using conventional characterisation methods, the probe propagation in the bandgap could be very small for strong gratings resulting in distorted or incomplete data. By integrating Equations (1a), (1b) or by using (4), the complex coupling coefficient of the grating portion 60 located, e.g. at $z_2$, can be expressed as a function of the complex reflection coefficient at either end of the grating, i.e. at $z_1$ or $z_2$ $$q^*(z_2) = -2i\delta r(z_1,\delta)\exp[-2i\delta(z_2-z_1)], \quad (5a)$$

$$q(z_2) = -2i\delta r(z_2,\delta), \quad (5b)$$

where we used the solutions for $u(z,\delta)$ and $v(z,\delta)$ in the large detuning approximation $$u(z,\delta) = u(z_1,\delta)\exp[i\delta(z-z_1)], \quad (6a)$$

$$v(z,\delta) = v(z_2,\delta)\exp[-i\delta(z-z_2)], \quad (6b)$$

when the probe signal is incident from either the $z_1$ side or the $z_2$ side of the grating correspondingly. In the latter case, the reflection coefficient is also redefined to $r(z,\delta) = u(z,\delta)/v(z,\delta)$ to obtain Equation (5b).

The obtained formulae (5) substantiate the concept of calculating the complex coupling coefficient of the grating portion under fabrication using measured complex reflection coefficients.

Figure 3:
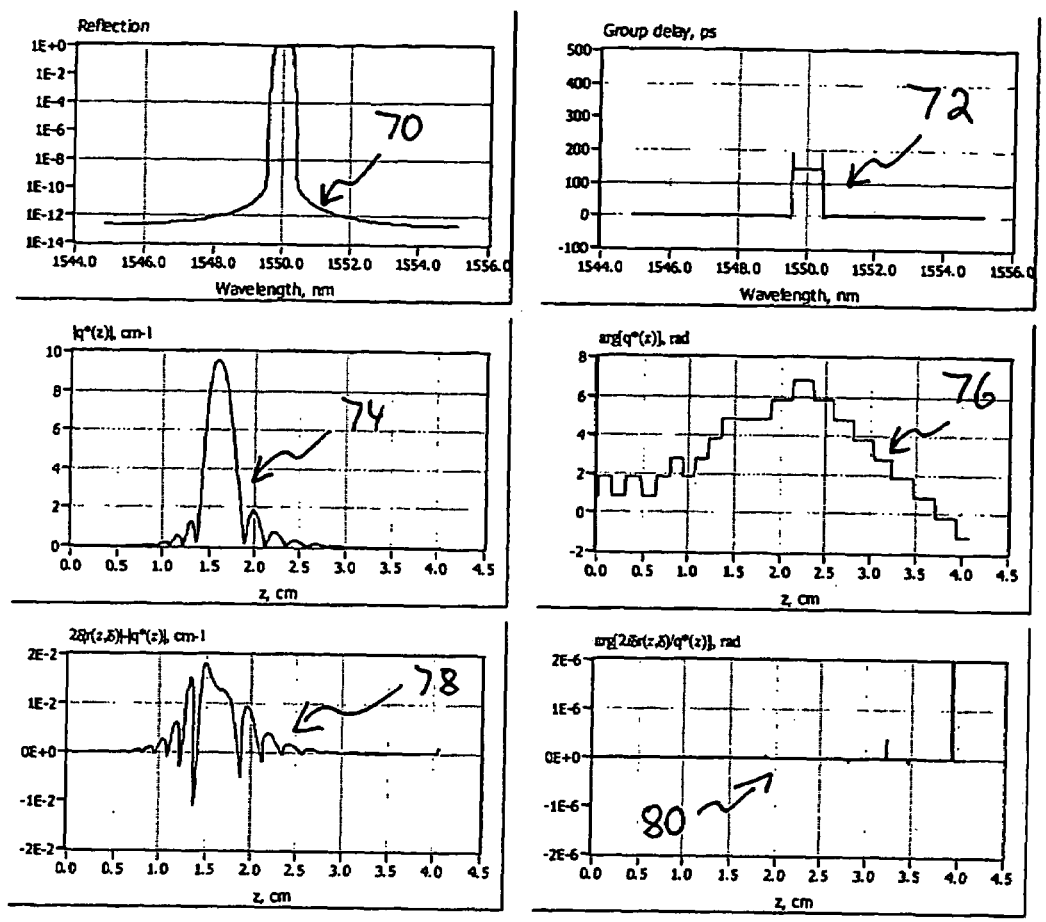
FIG. 3 shows simulation example plots for a dispersionless square shaped DWDM filter embodying the present invention.

A simulation example for a Dense Wavelength Division Multiplexer (DWDM) filter is shown in FIG. 3. The top two plots 70, 72 represent the reflection and the group delay of the square shaped filter with zero dispersion in the bandgap respectively. The amplitude and the phase of the grating coupling coefficient are shown in the middle plots 74, 76 and they have been derived from the reflection and the group delay spectra using an inverse scattering technique. The difference between this exact value of the grating coupling coefficient $q^*(z)$ and the value obtained using derived approximate Equation (4) represents the higher order terms in Equation (3) and is shown in the bottom plots 78, 80. As can be seen from the plots 78, 80, the amplitude error in the simulation example is about $2 \cdot 10^{-3}$.

Figure 4:
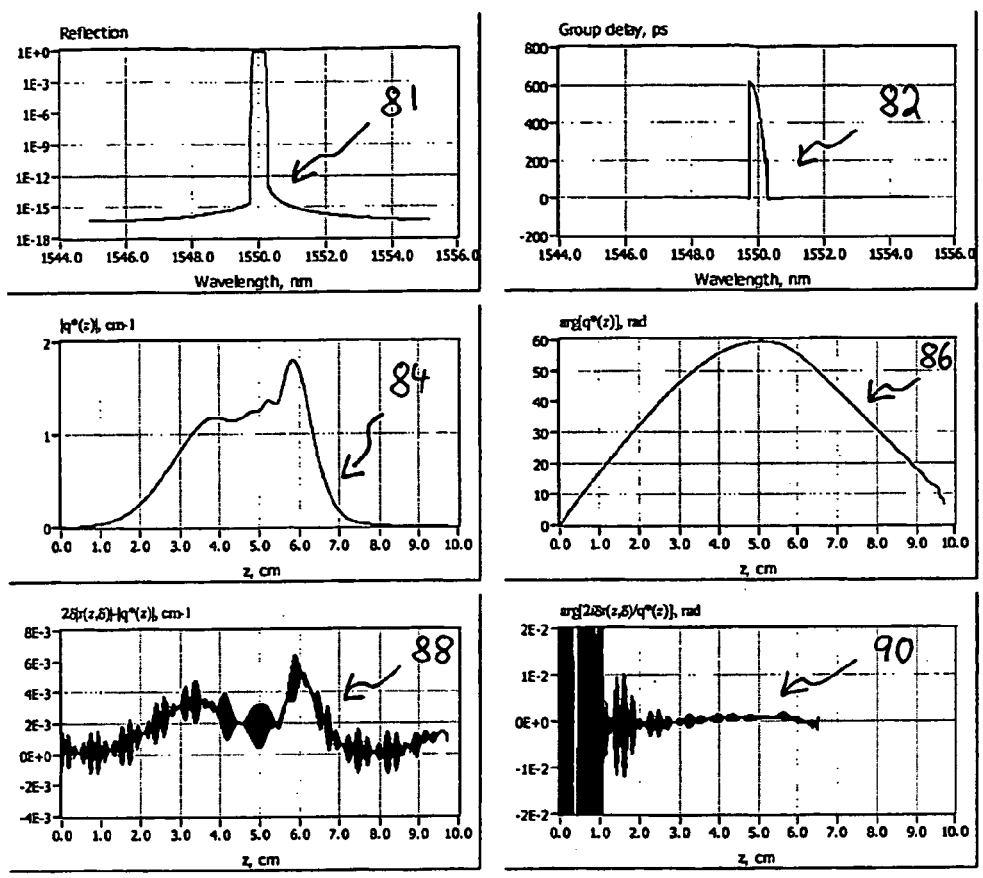
FIG. 4 shows simulation example plots for a chirped grating embodying the present invention.

Another simulation example for a chirped grating dispersion compensator is shown in FIG. 4, plots 81, 82, 84, 86, 88 and 90. A comparison of the results for this grating with the results for the previous one indicates that the accuracy of the method is somewhat design sensitive which should certainly be expected given the higher order terms in Equation (3).

The examples above demonstrate numerically the correctness of the analytically derived relationship (4) between the complex coupling coefficient of a local portion of the grating under fabrication and the complex reflection coefficient. The simplicity of the relationship represents a significant advantage for creating a feedback signal during the writing of a grating in an active feedback writing technique.

Since we have revealed the relationships between the complex coupling coefficients of the multi-layered structure under fabrication and the measured complex reflection coefficients, a preferred embodiment for measuring the complex reflection coefficients will now be described.

Measurements of the complex reflection coefficient can be performed in a number of different ways e.g. using measurement setups similar to OFDC or MPS referred to above, however, without the need to sweep the wavelength of the coherent laser source.

Figure 5:
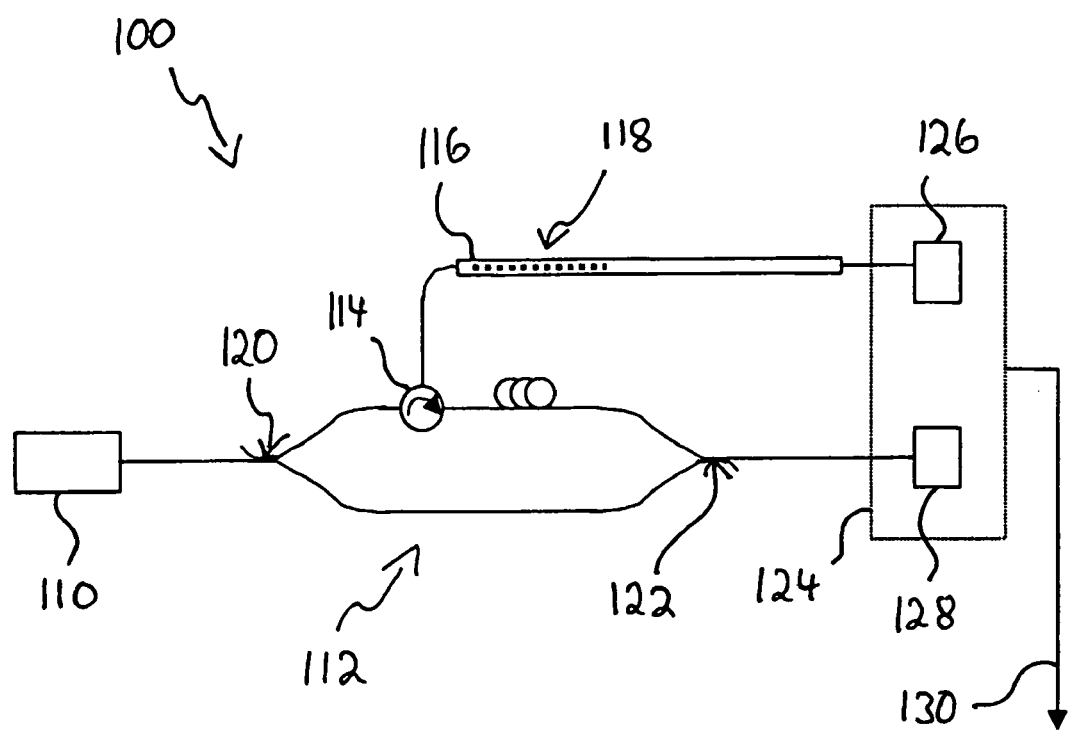
FIG. 5 shows a Mach-Zehnder interferometric arrangement for a characterisation system embodying the present invention.

One such example measurement setup 100 is shown in FIG. 5. The setup 100 comprises a laser source 110 and an optical circuit comprising of a Mach-Zehnder interferometer 112. One arm of the Mach-Zehnder 112 comprising a circulator 114 for directing the light signal into an optical fibre 116 into which a grating 118 is being progressively written, and for returning a reflected light signal from the grating 118 back into that arm. In the example embodiment, 3 dB couplers 120, 122 are utilised to form the Mach-Zehnder interferometer configuration.

A processing unit 124 comprises a detector unit 126 for detecting light transmitted through the optical fibre 116, and a detection unit 128 for detecting the output of the Mach-Zehnder interferometer 112. It will be appreciated by a person skilled in the art that thus the setup 100 can be utilised to measure the complex coupling coefficients of the local portion of the grating 118 under fabrication, since both amplitude and phase information are available at the processing unit 124, which in turn can be utilised to create a feedback signal 130 to the grating writing apparatus (not shown) during the writing of the grating 118 in an active feedback writing technique.

It is emphasised that in the setup 100, the wavelength of the laser source 110 does not need to be scanned or tuned to obtain spectral data as in the prior art. Rather, a fixed wavelength detuned from the bandgap of the desired optical grating 118 is used, as in accordance with the present invention, no spectral data is required, but rather a continued measurement of the complex reflection coefficient of the grating portion under fabrication only.

While the setup 100 represents an example embodiment of the present invention, it will be appreciated by the person skilled in the art that this setup may be susceptible to environmental fluctuations of the Mach-Zehnder interferometer 112. Furthermore, since the exact centre wavelength of the ultimate grating 118 and thus the detuning δ in equations 6(a) and 6(b) may not be known exactly, the measurements are preferably conducted at two separate fixed wavelengths outside of the bandgap of the grating 118 to eliminate the actual centre wavelength from the calculations. However, it will be appreciated that nevertheless the embodiment shown in FIG. 5 still achieves the advantage of reducing the amount of data required for creating a feedback signal in an active feedback grating writing technique.

Another preferred embodiment incorporating a novel approach for conducting the measurement of the complex reflection coefficient will next be described with reference to FIG. 6.

The approach described in relation to this embodiment is based on the fundamental relationship $$\frac{r(z_1, \delta)}{r^*(z_2, \delta)} = -\frac{t(\delta)}{t^*(\delta)} \tag{7}$$

which exists between the reflection coefficients for both directions of the probe signal incidence and the transmission coefficient which is independent of that direction. The existence of such a relationship suggests an interferometric characterisation technique with the reflected and transmitted signals interfering with each other. This can be achieved by placing the grating under fabrication 202 in a Sagnac loop 204 which, by virtue of the grating 202 in the loop 204, becomes a combined Sagnac/Michelson interferometric arrangement 200 as shown in FIG. 6. The output signals of the arrangement 200 in the case of 50/50 coupler 206 are as follows $$\frac{I_{left}}{I_0} = T + R\cos^2\Phi, \tag{8a}$$

$$\frac{I_{right}}{I_0} = R\sin^2\Phi, \tag{8b}$$

where $I_0$ is the interferometer input at 208 and $I_{left}$, and $I_{right}$ are the interferometer output signal intensities at 210 and 212 respectively, $T=|t|^2$ and $R=|r|^2$ are the grating transmission and reflection correspondingly, and the phase $\Phi$ is determined by both the grating phase and the imbalance of the Michelson interferometer arms $L_1$ and $L_2$ due to both generally asymmetric location of the grating 202 in the Sagnac loop 204 and the dynamically changing grating length $L_2$ $$\Phi = \beta(L_1+L_2-L_3)-(\beta_0 L_2 + arg\ r) \equiv \Xi - \Theta. \tag{9}$$

The output signals can be processed, e.g. by adding and subtracting them, either optically or electronically after their detection by e.g. balanced pair of detectors (not shown), $$\frac{I_{left} + I_{right}}{I_0} = T + R, \tag{10a}$$

$$\frac{I_{left} - I_{right}}{I_0} = T + R\cos 2\Phi. \tag{10b}$$

As $\Phi$ is being dynamically changed during the grating fabrication process at a certain rate defined primarily by the fibre translation velocity and the grating design, the AC terms ($\Phi$-dependent) can be separated from the DC terms by e.g. using Fourier transform methods.

Figure 6:
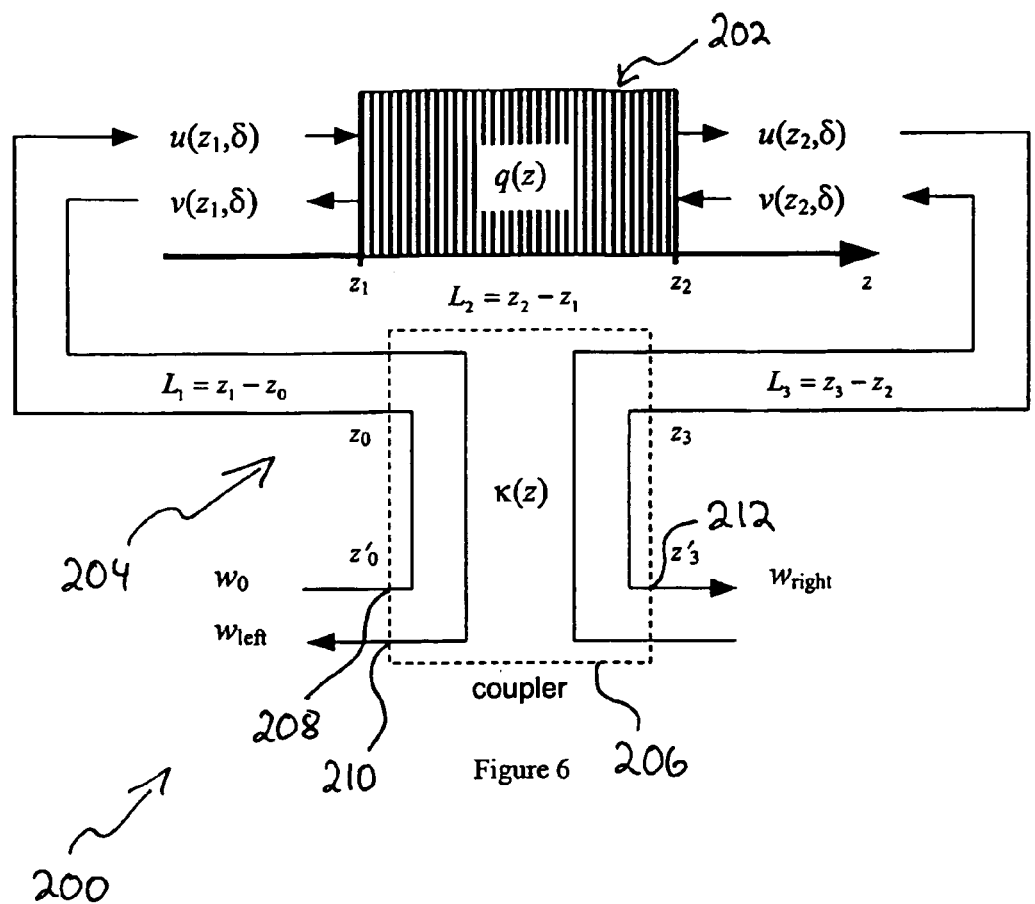
FIG. 6 shows a Sagnac/Michelson interferometric arrangement for a characterisation system embodying the present invention.

If the coupler 206 in the arrangement 200 shown in FIG. 6 slightly deviates from the 50/50 splitting ratio case, i.e. $K=\frac{1}{2}(1-\delta K)$, then $$\frac{I_{left} - I_{right}}{I_0} = T + R\cos 2\Phi - 4\delta K\sqrt{TR}\sin\Phi. \quad (11)$$

Therefore, using e.g. Fourier transform methods the effect of the coupling ratio variations on the $\Phi$ calculation accuracy can be minimised. Also, the coupling ratio can be intentionally modulated and locked to the 50/50 value by applying e.g. lock-in techniques.

Returning now to Equation (9), it will be appreciated that uncertainties are attached to both $\beta$ and ($L_1+L_2-L_3$) due to environmental fluctuations. However, if in the experiment the data are collected at two wavelengths, then the phase term $\Theta$ determined by only the fibre translation rate and the actual current grating phase can be calculated:

$$\Theta = \beta_0 L_2 + \arg r = -\Phi + \beta\frac{\Delta\Phi}{\Delta\beta}. \quad (12)$$

Thus, the effect of likely significant environmental fluctuations of the Michelson interferometer arms (changes in $L_1$ and $L_3$) can be dramatically reduced by using at least two fixed single-frequency stabilized lasers to perform the measurements at two wavelengths at least. Importantly, the measurement noise can be significantly reduced by optical filtering of only the narrow linewidth signals associated with the fixed-wavelength laser sources (not shown).

Figure 7:
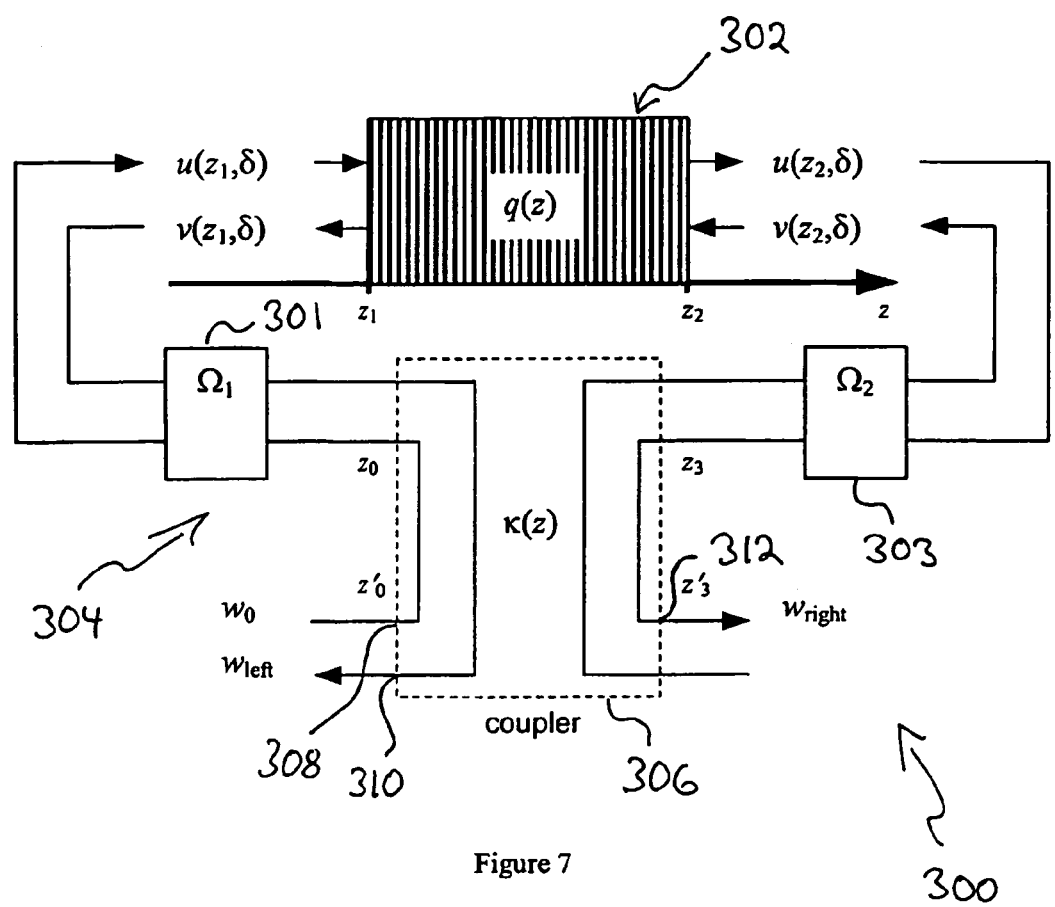
FIG. 7 shows a Sagnac/Michelson interferometric arrangement with frequency shifters for a characterisation system embodying the present invention.

Referring now to FIG. 7, another preferred embodiment of implementing the present invention during the writing of a grating 302 will be described.

The signals $I_{left}$ at 310 and $I_{right}$ at 312 resulting from the outputs of the interferometric arrangement 300 shown in FIG. 7 can be described by the following expressions $$\frac{I_{left} + I_{right}}{I_0} = T\alpha_1^2\alpha_2^2 + R(\alpha_1^4\cos^2\kappa L_0 + \alpha_2^4\sin^2\kappa L_0) - \quad (13a)$$
$$\sqrt{TR}\,\alpha_1\alpha_2(\alpha_1^2 - \alpha_2^2)\sin 2\kappa L_0 \sin\Phi$$

$$\frac{I_{left} - I_{right}}{I_0} = -T\alpha_1^2\alpha_2^2\cos 4\kappa L_0 + \quad (13b)$$
$$R(\alpha_1^4\cos^2\kappa L_0 - \alpha_2^4\sin^2\kappa L_0)\cos 2\kappa L_0 -$$
$$\sqrt{TR}\,\alpha_1\alpha_2[(3\alpha_1^2 + \alpha_2^2)\cos^2\kappa L_0 -$$
$$(3\alpha_2^2 + \alpha_1^2)\sin^2\kappa L_0]\sin 2\kappa L_0 \sin\Phi +$$
$$R\alpha_1^2\alpha_2^2\sin^2 2\kappa L_0 \cos 2\Phi$$

where $I_0$ is the input signal at 308, $K=\sin^2\kappa L_0$ is the coupling ratio of the coupler, with $\kappa$ and $L_0$ being the coupling coefficient and the length of the coupling region, $\alpha_1$ and $\alpha_2$ are the one-way transmission coefficients in the corresponding Michelson arms which are defined by both the splice losses of the grating to the arrangement and the diffraction efficiencies of the frequency shifters.

Using the frequency shifters 301, 303 shown in FIG. 7 has been motivated by the following potential advantages:

(a) Ability to normalize the reflection responses from the opposite ends of the grating which may otherwise be different due to e.g. different splice losses at the ends of the grating. Minimizing the corresponding oscillating term $\propto(\alpha_1^2-\alpha_2^2)\sin\Phi$ (see Equation (13a)) can be achieved by appropriate control of the diffraction efficiency of the frequency shifters.

(b) Ability to control the rate of the phase change $\Theta$ by changing the shifting frequencies $\Omega_1$ and $\Omega_2$:

$$\Theta = \beta_0\int v_f(t)\,dt + \arg r + \int[\Omega_1(t)-\Omega_2(t)]dt \quad (14)$$

which gives a lot of flexibility in detecting and separating, through control of the offset introduced, the terms proportional to $\Theta$ and $2\Theta$ or $\Phi$ and $2\Phi$ in Equations (13). The frequency shift could be continuously (synchronously) changed so that e.g. the corresponding accumulated phase change would represent the control signal for the grating writing system. Thus, a pure phase error signal acquired due to either imperfect translation, or imperfect fibre diameter, or due to any other reason, could be obtained without the need for further processing (assuming that the dual-wavelength processing has been completed). This signal would be used to lock-in to the theoretical grating phase. The rate of the "linearised" (control signal subtracted) phase change can be adjusted to a convenient or an optimum frequency defined by the lock-in used, phase noise statistics, etc. It can e.g. be chosen such that the interferometric arrangement operates at a dark fringe with respect to the 'dark' (right) output of the interferometer to reduce the effect of the laser source noise on the signal at that output.

It will be appreciated by the person skilled in the art that numerous modifications and/or variations may be made to the present invention as shown in the specific embodiments without departing from the spirit or scope of the invention as broadly described. The present embodiments are, therefore, to be considered in all respects to be illustrative and not restrictive.

For example, multi-layered structures can be fabricated using various known techniques of forming such structures, including one or more of the group of photo-induced refractive index variation in photosensitive waveguide materials, etching techniques including etching techniques utilising a phasemask, and epitaxial techniques. Furthermore, while the preferred embodiments have been described in the context of 1-dimensional Bragg gratings, the present invention does extend to multi-dimensional multi-layered structures. Such structures have applications e.g. as photonic bandgap structures.

In the claims that follow and in the summary of the invention, except where the context requires otherwise due to express language or necessary implication the word "comprising" is used in the sense of "including", i.e. the features specified may be associated with further features in various embodiments of the invention.

The invention claimed is:

1. A method of characterising a multi-layered structure during formation of said multi-layered structure, the method comprising extracting, continuously or at intervals during the formation process, a complex coupling coefficient of the multi-layered structure being formed.

2. A method as claimed in claim 1, wherein extracting the complex coupling coefficient comprises measuring a complex reflectivity of the multi-layered structure at a wavelength outside of a bandgap of the multi-layered structure and calculating the complex coupling coefficient from the measured complex reflectivity.

3. A method as claimed in claim 2, wherein calculating the complex coupling coefficient uses a linear proportionality between the complex coupling coefficient and the measured complex reflectivity.

4. A method as claimed in claim 2, wherein the complex reflectivity is measured, continuously or at each interval, for at least two wavelengths outside of the bandgap of the multi-layered structure.

5. A method as claimed in claim 2, wherein measuring the complex reflectivity of the multi-layered structure comprises utilising a Sagnac/Michelson interferometer setup, wherein the multi-layered structure is located in the Sagnac loop.

6. A method as claimed in claim 5, wherein the Sagnac/Michelson interferometer setup comprises a 2×2 coupler.

7. A method as claimed in claim 5, wherein the Sagnac/Michelson interferometer setup comprises a 3×3 coupler.

8. A method as claimed in claim 5, wherein the method further comprises controlling a phase rate offset in the phase measurement of the complex reflectivity of the multi-layered structure.

9. A method as claimed in claim 1, wherein the method further comprises utilising a comparison of the extracted complex coupling coefficient and a specified complex coupling coefficient profile of the multi-layered structure as a feedback during the formation process.

10. A method as claimed in claim 1, wherein the multi-layered structure comprises a Bragg grating.

11. A method as claimed in claim 10, wherein the grating is formed in an optical waveguide.

12. A method as claimed in claim 11, wherein the waveguide comprises an optical fibre.

13. An apparatus for forming a multi-layered structure of specified complex coupling coefficient profile, the apparatus comprising:
a complex coupling coefficient extractor for extracting a complex coupling coefficient of the multi-layered structure being formed, wherein the complex coupling coefficient is extracted continuously or at intervals during the multi-layered structure formation process, and
a processing unit arranged, in use, to generate a feedback signal for use in the formation process based on a comparison of the extracted complex coupling coefficient and the specified complex coupling coefficient profile.

14. An apparatus as claimed in claim 13, wherein the complex coupling coefficient extractor comprises a measurement unit for measuring a complex reflectivity of the multi-layered structure at a wavelength outside of a bandgap of the multi-layered structure, and a calculating unit for calculating the complex coupling coefficient from the measured complex reflectivity.

15. An apparatus as claimed in claim 14, wherein the calculating unit for calculating the complex coupling coefficient uses a linear proportionality between the complex coupling coefficient and the measured complex reflectivity.

16. An apparatus as claimed in claim 14, wherein the measurement unit is arranged, in use, to measure, continuously or at each interval, the reflectivity for at least two wavelengths outside of the bandgap of the multi-layered structure.

17. An apparatus as claimed in claim 14, wherein the measurement unit comprises a Sagnac/Michelson interferometer, wherein the multi-layered structure is located in the Sagnac loop.

18. An apparatus as claimed in claim 17, wherein the Sagnac/Michelson interferometer comprises a 2×2 coupler.

19. An apparatus as claimed in claim 17, wherein the Sagnac/Michelson interferometer comprises a 3×3 coupler.

20. An apparatus as claimed in claim 17, wherein the Sagnac/Michelson interferometer comprises a means for controlling a phase rate offset in the phase measurement of the complex reflectivity of the multi-layered structure.

21. An apparatus as claimed in claim 20, wherein the means for controlling the phase rate offset comprises an optical modulator located in the Sagnac/Michelson loop on at least one side of the multi-layered structure.

22. An apparatus as claimed in claim 21, wherein the modulator comprises an acousto-optic modulator or an electro-optic modulator.

23. An apparatus as claimed in claim 13, wherein the apparatus further comprises a feedback unit for providing the generated feedback signal to a writing unit for forming the multi-layered structure.

24. An apparatus as claimed in claim 23, wherein the apparatus further comprises the writing unit.

25. An active feedback fabrication method for forming a multi-layered structure, the method comprising:
extracting, continuously or at intervals during the formation process, a complex coupling coefficient of the multi-layered structure being formed, and
utilising a comparison of the extracted complex coupling coefficient and a specified complex coupling coefficient profile of the multi-layered structure as a feedback during the formation process.

* * * * *